(12) United States Patent
Alspaugh

(10) Patent No.: US 10,836,525 B1
(45) Date of Patent: Nov. 17, 2020

(54) ROBOTIC GRIPPER FOR BAGGING ITEMS

(71) Applicant: Amazon Technologies, Inc., Seattle, WA (US)

(72) Inventor: David Alspaugh, Seattle, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 456 days.

(21) Appl. No.: 15/451,614

(22) Filed: Mar. 7, 2017

(51) Int. Cl.
| | | |
|---|---|---|
| *B65B 43/30* | (2006.01) | |
| *B25J 15/00* | (2006.01) | |
| *B65B 5/04* | (2006.01) | |
| *B65B 35/16* | (2006.01) | |
| *B65B 43/36* | (2006.01) | |

(52) U.S. Cl.
CPC ........... *B65B 43/30* (2013.01); *B25J 15/0047* (2013.01); *B65B 5/045* (2013.01); *B65B 35/16* (2013.01); *B65B 43/36* (2013.01)

(58) Field of Classification Search
CPC ....... B65B 43/465; B65B 43/30; B65B 5/045; B65B 35/16; B65B 43/36; B25J 19/028; B25J 21/00; B25J 15/0047
USPC ............................................. 53/384.1, 385.1
See application file for complete search history.

(56) References Cited

U.S. PATENT DOCUMENTS

| | | | | |
|---|---|---|---|---|
| 3,985,302 A * | 10/1976 | Frochaux | ................ | B05B 1/005 239/424 |
| 4,141,194 A * | 2/1979 | Rochman | ................ | B65B 5/045 53/138.4 |
| 4,687,462 A * | 8/1987 | Rewitzer | ................. | B65B 43/26 493/100 |
| 5,100,370 A * | 3/1992 | Barbour | ................. | B29O 63/34 493/100 |
| 5,403,056 A * | 4/1995 | Wallace | ............... | B25J 15/0023 294/98.1 |
| 5,419,095 A * | 5/1995 | Yohe | ....................... | B65B 69/00 414/412 |
| 5,452,932 A * | 9/1995 | Griffin | ..................... | B25J 15/00 294/216 |
| 5,463,844 A * | 11/1995 | Moehlenbrock | ........ | B65B 5/045 426/410 |
| 6,662,532 B1 * | 12/2003 | Droog | ..................... | B65B 43/36 53/373.6 |
| 6,773,385 B2 * | 8/2004 | Johnson | .................. | B31B 50/00 493/100 |
| 6,860,531 B2 * | 3/2005 | Sherwin | ............... | B25J 15/0052 294/103.1 |
| 6,976,350 B2 * | 12/2005 | Greening | ................ | B65B 43/44 53/384.1 |
| 7,153,085 B2 * | 12/2006 | Clark | ................... | B25J 15/0052 414/729 |
| 7,568,328 B2 * | 8/2009 | Imao | ....................... | B65B 5/045 53/284.7 |
| 9,193,490 B2 * | 11/2015 | Actis | ....................... | B65B 65/00 |
| 9,278,449 B1 * | 3/2016 | Linnell | .................... | B25J 9/163 |
| 9,821,475 B1 * | 11/2017 | Lynn | ....................... | B25J 18/06 |
| 9,919,424 B1 * | 3/2018 | Devengenzo | .......... | B25J 9/1656 |

(Continued)

*Primary Examiner* — Anna K Kinsaul
*Assistant Examiner* — Daniel Jeremy Leeds
(74) *Attorney, Agent, or Firm* — Thomas Horstemeyer, LLP; Jason M. Perilla

(57) ABSTRACT

Disclosed are various embodiments or a robotic gripper. A mechanical gripper is affixed to an end effector of the robotic arm. A mount is also affixed to the mechanical gripper. An air nozzle may be affixed to the mount. The air nozzle can include an egress directed towards the mechanical gripper.

12 Claims, 11 Drawing Sheets

(56) References Cited

U.S. PATENT DOCUMENTS

| | | | |
|---|---|---|---|
| 10,207,402 B2* | 2/2019 | Levine | B25J 9/161 |
| 2004/0035087 A1* | 2/2004 | Kujubu | B65B 25/064 |
| | | | 53/257 |
| 2006/0259195 A1* | 11/2006 | Eliuk | A61J 1/20 |
| | | | 700/245 |
| 2009/0158694 A1* | 6/2009 | Matheyka | B65B 43/465 |
| | | | 53/468 |
| 2010/0209298 A1* | 8/2010 | Kalra | B01L 3/508 |
| | | | 422/63 |
| 2012/0095596 A1* | 4/2012 | Cole | B25J 9/06 |
| | | | 700/253 |
| 2012/0240531 A1* | 9/2012 | Kawamura | B65B 31/042 |
| | | | 53/572 |
| 2013/0067869 A1* | 3/2013 | Takata | B25J 9/0093 |
| | | | 53/473 |
| 2013/0255199 A1* | 10/2013 | Haschke | B65B 65/00 |
| | | | 53/473 |
| 2014/0083061 A1* | 3/2014 | Ibaraki | B65B 3/02 |
| | | | 53/558 |
| 2014/0102045 A1* | 4/2014 | Yoshikane | B65B 43/465 |
| | | | 53/459 |
| 2014/0180479 A1* | 6/2014 | Argue | B25J 9/0093 |
| | | | 700/259 |
| 2015/0028050 A1* | 1/2015 | Huang | B25J 15/0616 |
| | | | 221/211 |
| 2015/0290795 A1* | 10/2015 | Oleynik | G05B 19/42 |
| | | | 700/257 |
| 2016/0122057 A1* | 5/2016 | Takahashi | B65B 5/067 |
| | | | 53/284.7 |
| 2016/0207202 A1* | 7/2016 | Lee | B25J 15/0491 |
| 2016/0229067 A1* | 8/2016 | Nishimura | B25J 19/028 |
| 2016/0272354 A1* | 9/2016 | Nammoto | B65B 57/06 |
| 2016/0278295 A1* | 9/2016 | Johnson | A01F 25/14 |
| 2017/0042624 A1* | 2/2017 | Yeung | A61B 34/35 |
| 2017/0050282 A1* | 2/2017 | Kruck | B23Q 3/061 |
| 2017/0080571 A1* | 3/2017 | Wagner | B25J 9/1694 |
| 2017/0152067 A1* | 6/2017 | Nakamoto | B65B 43/26 |
| 2017/0182660 A1* | 6/2017 | Pipitone | B25J 13/085 |
| 2017/0203867 A1* | 7/2017 | Shook | B65B 7/02 |
| 2017/0265392 A1* | 9/2017 | Van De Vegte | A01G 18/00 |
| 2017/0282634 A1* | 10/2017 | Jones | B43M 3/04 |
| 2017/0320216 A1* | 11/2017 | Strauss | B25J 15/0009 |
| 2018/0050512 A1* | 2/2018 | Borgstrom | B65B 31/048 |
| 2018/0079539 A1* | 3/2018 | Borgstrom | B65B 31/04 |
| 2018/0186011 A1* | 7/2018 | Pryor | B25J 11/0045 |
| 2018/0222616 A1* | 8/2018 | Lewis | B65B 43/28 |

\* cited by examiner

ROBOTIC GRIPPER FOR BAGGING ITEMS

BACKGROUND

Items are often packaged on conveyor belts using robotic workers. Accordingly, one factor in selecting the packaging materials or method of packaging to be used is the robotic worker itself. Certain packaging materials are less likely to be used when a robotic worker is packing an item for shipment because the robotic worker is unable to easily or reliably manipulate the packaging material. Likewise, other types of packaging materials are more likely to be used, even if they are more expensive or have other disadvantages, because a robotic worker can more easily and reliably manipulate them.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure is directed to various embodiments of a robotic gripper. The robotic gripper may be affixed to a robotic arm in order to allow the robotic arm to insert the gripper into a bag and then grab an item using the bag. To remove the bag from the gripper, air may be blown over the fingers of the gripper. In some instances, this may result in the bag encompassing or wrapping itself around the item. In the following discussion, a general description of the system and its components is provided, followed by a discussion of the operation of the same.

Figure 1A:
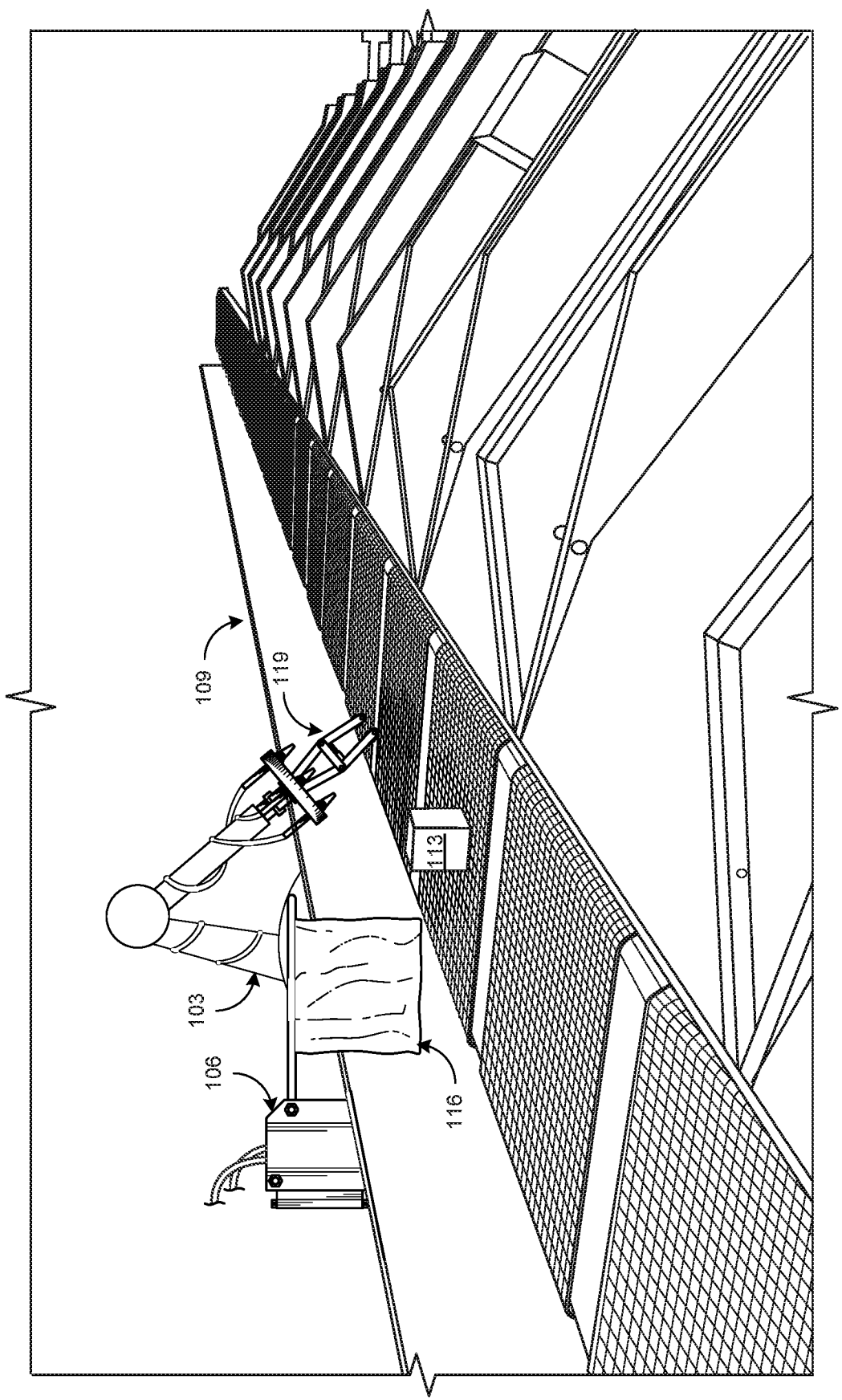
FIG. 1A is a drawing depicting an example implementation of one of several embodiments of the present disclosure.

Illustrated in FIG. 1A is an example implementation of various embodiments of the present disclosure. As shown, a robotic arm 103 and a bag dispenser 106 are positioned next to a conveyor belt 109. Items 113 placed on the conveyor belt 109 can move past the robotic arm 103 and the bag dispenser 106. The item 113 can include any object that an operator of the robotic arm 103 or conveyor belt 109 may wish to enclose in a bag 116. As will be further illustrated in subsequent drawings, the robotic arm 103 can insert a gripper 119 affixed to the end of the robotic arm 103 into a bag 116 hanging from the bag dispenser 106. The gripper 119 can then grab the bag 116. After the gripper 119 grabs the bag 116, the robot arm 103 can move over the item 113 and use the gripper 119 to grab the item 113 with the bag 116. As a result, the item 113 is inside the bag after being gripped. The gripper 119 can then release the item 113 and the bag 116, allowing for the item 113 to remain inside the bag 116 as the item continues to move down the conveyor belt 109.

Figure 1B:
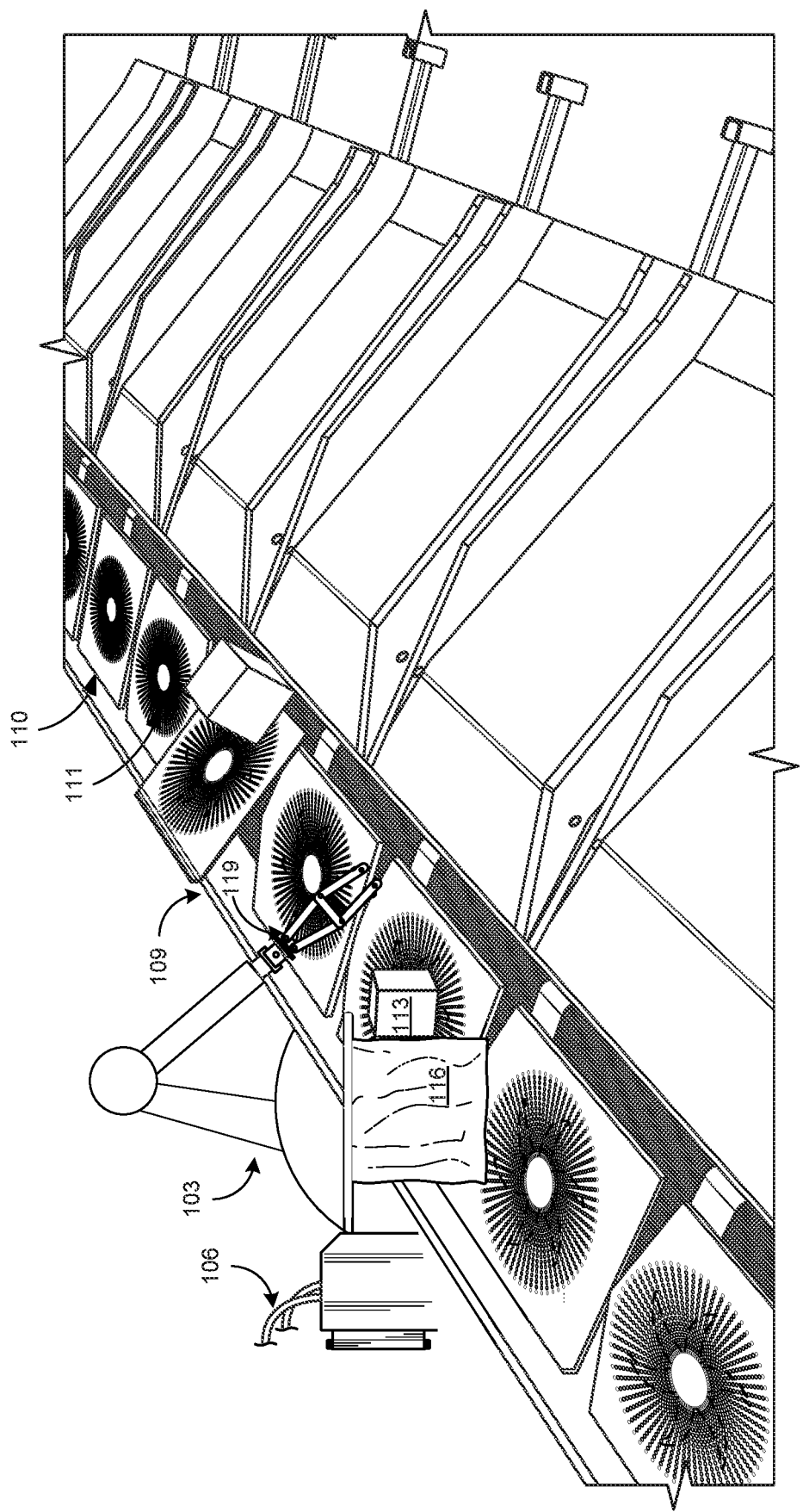
FIG. 1B is a drawing depicting an example implementation of one of several embodiments of the present disclosure.

FIG. 1B illustrates another example implementation of various embodiments of the present disclosure. As shown, a robotic arm 103 and a bag dispenser 106 are positioned next to a conveyor belt 109. The conveyor belt 109 can include one or more conveyor segments 110. Examples of conveyor segments 110 include tilt trays, as illustrated, cross-belt segments, or similar components. Each conveyor segment 110 can also include an air displacement device 111, which can pull a volume of air down through a perforated surface of the conveyor segment 110. Examples of air displacement devices 111 include fans, suction pumps, reverse Venturi valves, or similar devices. Items 113 placed on the conveyor belt 109 can move past the robotic arm 103 and the bag dispenser 106. The item 113 can include any object that an operator of the robotic arm 103 or conveyor belt 109 may wish to enclose in a bag 116. As will be further illustrated in subsequent drawings, the robotic arm 103 can insert a gripper 119 affixed to the end of the robotic arm 103 into a bag 116 hanging from the bag dispenser 106. The gripper 119 can then grab the bag 116. After the gripper 119 grabs the bag 116, the robot arm 103 can move over the item 113 and use the gripper 119 to grab the item 113 with the bag 116. As a result, the item 113 is inside the bag after being gripped. The air displacement device 111 underneath the gripper 119 can then pull air through the conveyor segment 100, relying on the movement of the air to pull the bag 116 off of the gripper 119 and over the item 113, thereby enclosing the item 113 within the bag 116. The gripper 119 can then release the item 113 and the bag 116, allowing for the item 113 to remain inside the bag 116 as the item continues to move down the conveyor belt 109.

Figure 2:
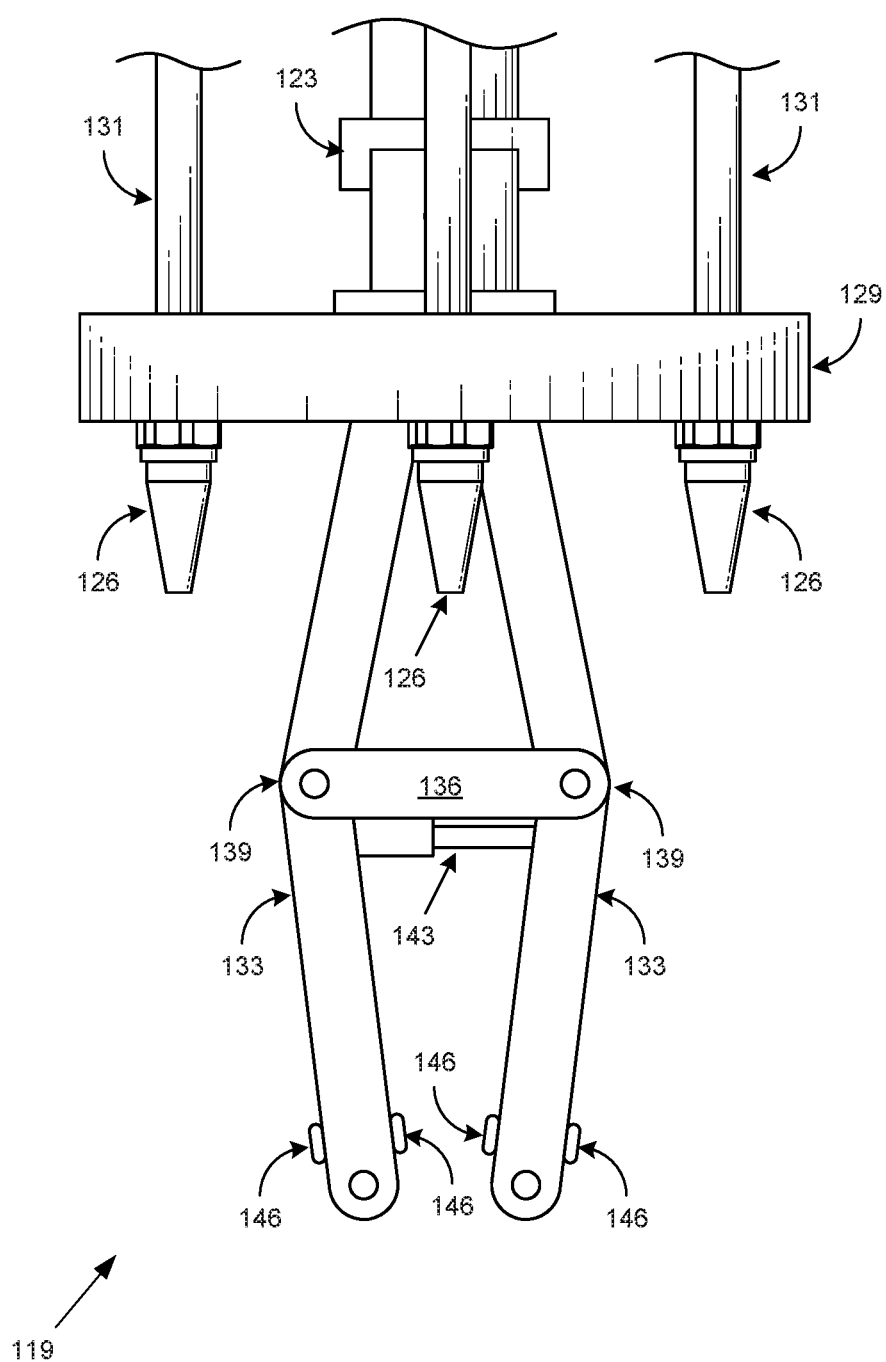
FIG. 2 is a drawing depicting one of several embodiments of a robotic gripper according to various embodiments of the present disclosure.

FIG. 2 illustrates an example embodiment of a gripper 119 among various embodiments of the present disclosure. The gripper 119 can be affixed to an end effector 123 of the robotic arm 103 (FIG. 1). However, in other embodiments, the gripper 119 may instead be permanently attached or otherwise affixed to the robotic arm 103.

The gripper 119 may include one or more air nozzles 126 which can be used to displace air. The air nozzles 126 can be mounted in various locations on the gripper 119. For example in some embodiments, the air nozzles 126 can be affixed to a mount 129. In other embodiments, the air nozzles 126 can be affixed to one or more fingers 133 extending from the gripper 119. Likewise, some embodiments can have one or more air nozzles 126 affixed to the robotic arm 103 itself.

In some embodiments where the air nozzles 126 are affixed to the mount 129, the mount 129 may be circular or substantially circular (e.g., elliptical, ovoid, etc.) in shape. However, the mount 129 can be arranged in other shapes as needed for any particular implementation. In some instances, the air nozzles 126 can be spaced on the mount 129 at equidistant intervals. However, other implementations may use other spacing intervals for the air nozzles 126 as appropriate for the particular implementation. One or more of the air nozzles 126 can also be oriented at various angles. For example, an air nozzle 126 may be positioned perpendicular to the mount 129, as depicted in FIG. 2, or at an angle, as depicted in some subsequent drawings. In some embodiments, each air nozzle 126 may be fed by an air tube 131. However, multiple air nozzles 126 may be fed by a shared air tube 131 in other embodiments of the present disclosure.

Extending from the gripper 119 are two or more fingers 133, which can be used to grip or grab an item 113 (FIG. 1). In some embodiments, such as the embodiment depicted in FIG. 2, the fingers 133 can be connected by a spacing bar 136 that keeps the joints 139 of the fingers 133 at a constant distance to prevent the fingers 133 from expanding too far apart. In these embodiments, the fingers 133 can be opened or closed using an actuator 143, such as a hydraulic, pneumatic, or other actuator.

One or more sensors 146 may be affixed to each finger 133. These sensors 146 may be used to provide environmental feedback regarding the operation or current state of the gripper 119. For example, a sensor 146 may be placed on an extensor surface of a finger 133 to allow the gripper 119 to determine that it has gripped a bag 116 (FIG. 1) as the fingers are extended outwards after the gripper 119 has been inserted into the bag 116. Likewise, a sensor 146 may be placed on a flexor surface of a finger 133 to allow a gripper 119 to determine that is has gripped an item 113 (FIG. 1).

Various kinds or types of sensors 146 may be used in various embodiments of the present disclosure. For example, piezoelectric sensors could be used to detect changes in electric resistance as the sensor 146 comes in contact with an object. As another example, capacitive sensors could be used to detect changes in capacitance as the sensor 146 comes in contact with an object. In some examples, optical sensors could be used to detect changes in light. For example, one or more optical sensors could determine that the gripper 119 has gripped an item 113 when the optical sensors ceases detecting light (e.g., the optical sensor has been occluded or otherwise covered by the item 113). As another example, one or more optical sensors could determine that the fingers 133 of the gripper are inside a bag 116 due to a reduced amount of light being detected or received by the optical sensor. This would allow for the gripper 119 to determine that the fingers 133 are within a translucent bag 116 (e.g., a plastic bag) due to a reduce amount of light reaching the optical sensors. Likewise, the gripper 119 could determine that the fingers 133 are within an opaque bag (e.g., a thick paper bag) due to a more significant decrease in the amount of light being detected by the optical sensor. Other types of sensors 146 may also be used as appropriate for a particular implementation or embodiment of the present disclosure.

Figure 3:
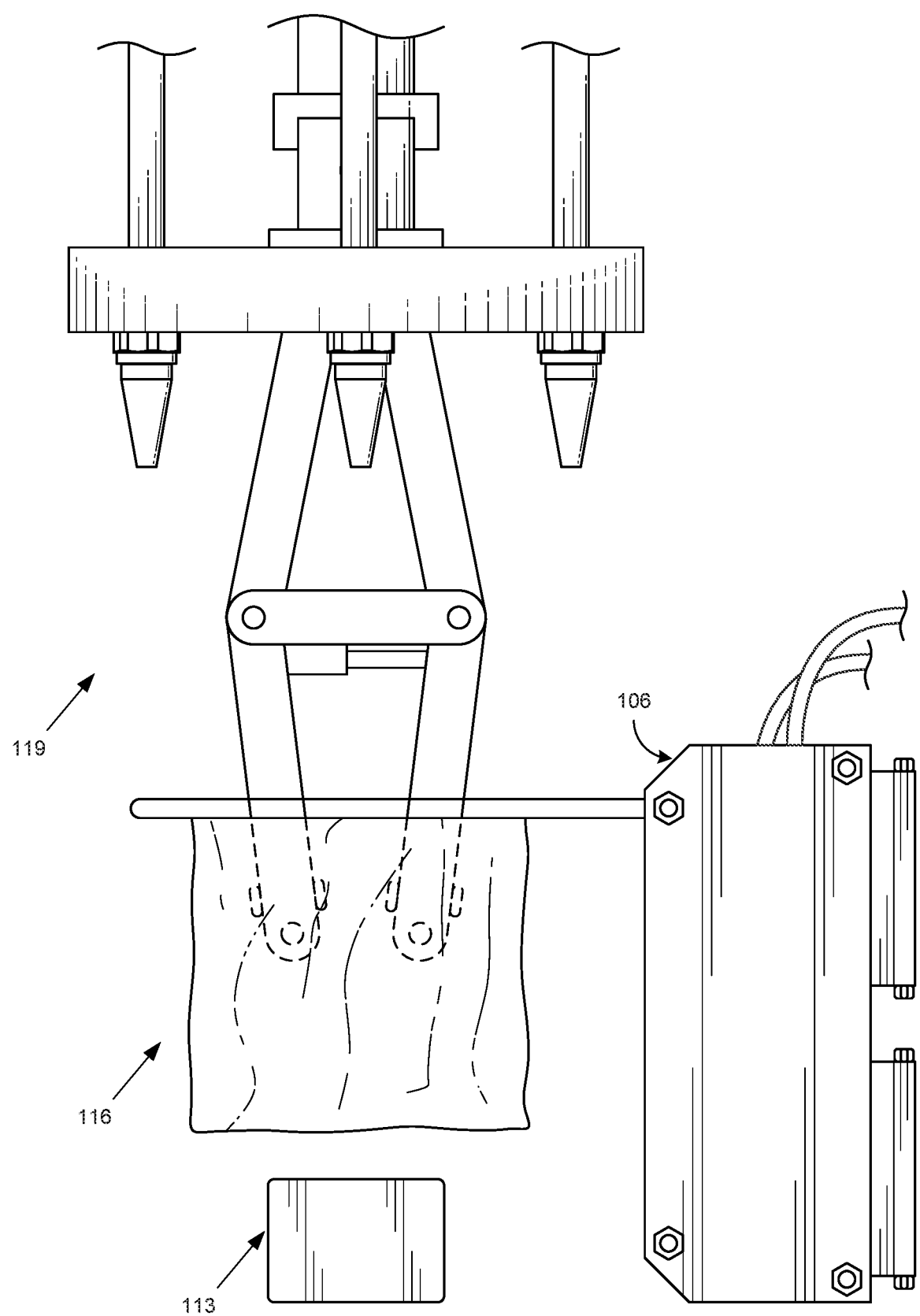
FIG. 3 is a drawing depicting the operation of an example embodiment of the robotic gripper, according to various embodiments of the present disclosure.

FIG. 3 illustrates a first step in the operation of an example embodiment of the present disclosure. In the illustrated step, the robotic arm 103 (FIG. 1) inserts the gripper 119 into a bag 116 held by a bag dispenser 106. In some embodiments, the item 113 to be grabbed by the gripper may be located underneath the bag 116, allowing the gripper 119 to directly grip the item 113 through the bag 116. However, in other embodiments, the item 113 may be in another location.

Figure 4:
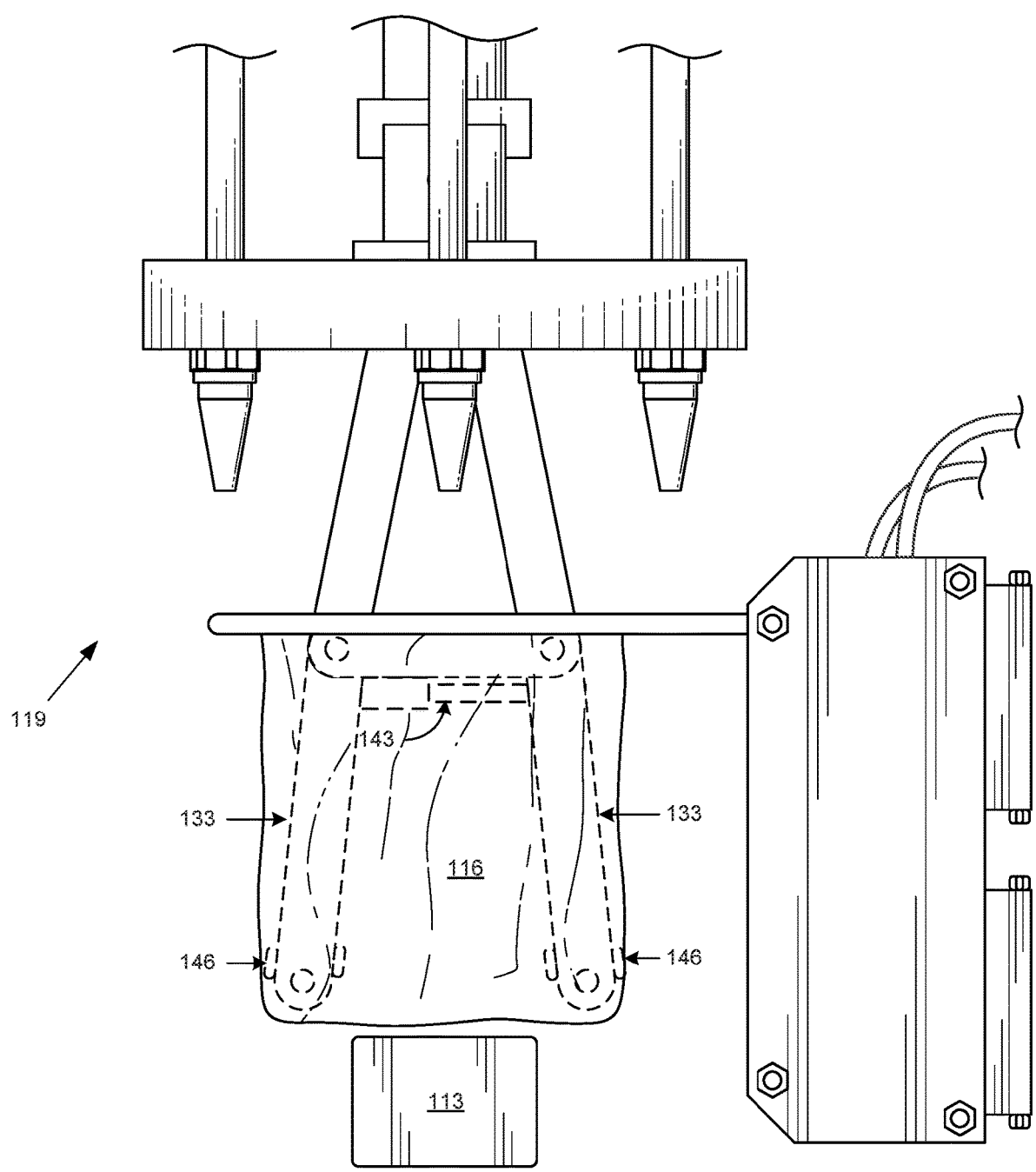
FIG. 4 is a drawing depicting the operation of an example embodiment of the robotic gripper, according to various embodiments of the present disclosure.

FIG. 4 illustrates a second step in the operation of an example embodiment of the present disclosure. As illustrated, the actuator 143 opens the fingers 133 of the gripper 119 to engage the sides of the bag 116. Sensors 146 located on the extensor surfaces of the fingers 133 may detect when the fingers 133 of the gripper 119 come into contact with the sides of the bag 116, causing the actuator to halt.

Figure 5:
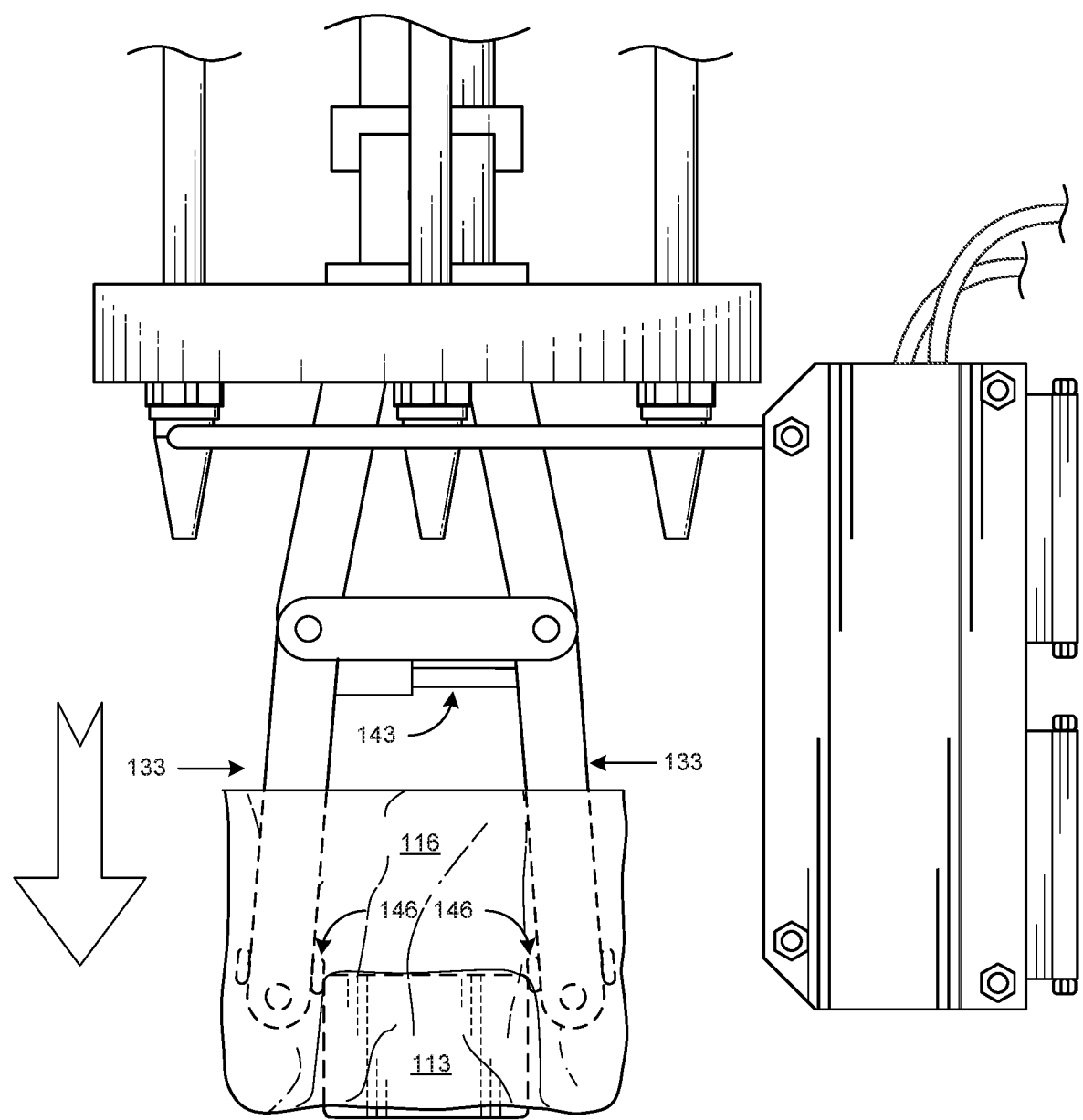
FIG. 5 is a drawing depicting the operation of an example embodiment of the robotic gripper, according to various embodiments of the present disclosure.

FIG. 5 illustrates a third step in the operation of an example embodiment of the present disclosure. As illustrated, the robotic arm 103 (FIG. 1) moves the bag 116 over the item 113 and grips the item 113 through the bag 116. To grip the item 113, the actuator 143 closes of the fingers 133 of the gripper 119 until the fingers 133 come into contact with the item 113. Sensors 146 located on the flexor surfaces of the fingers 133 may detect when the fingers 133 of the gripper 119 come into contact with the sides of the item 113, causing the actuator to halt.

Figure 6A:
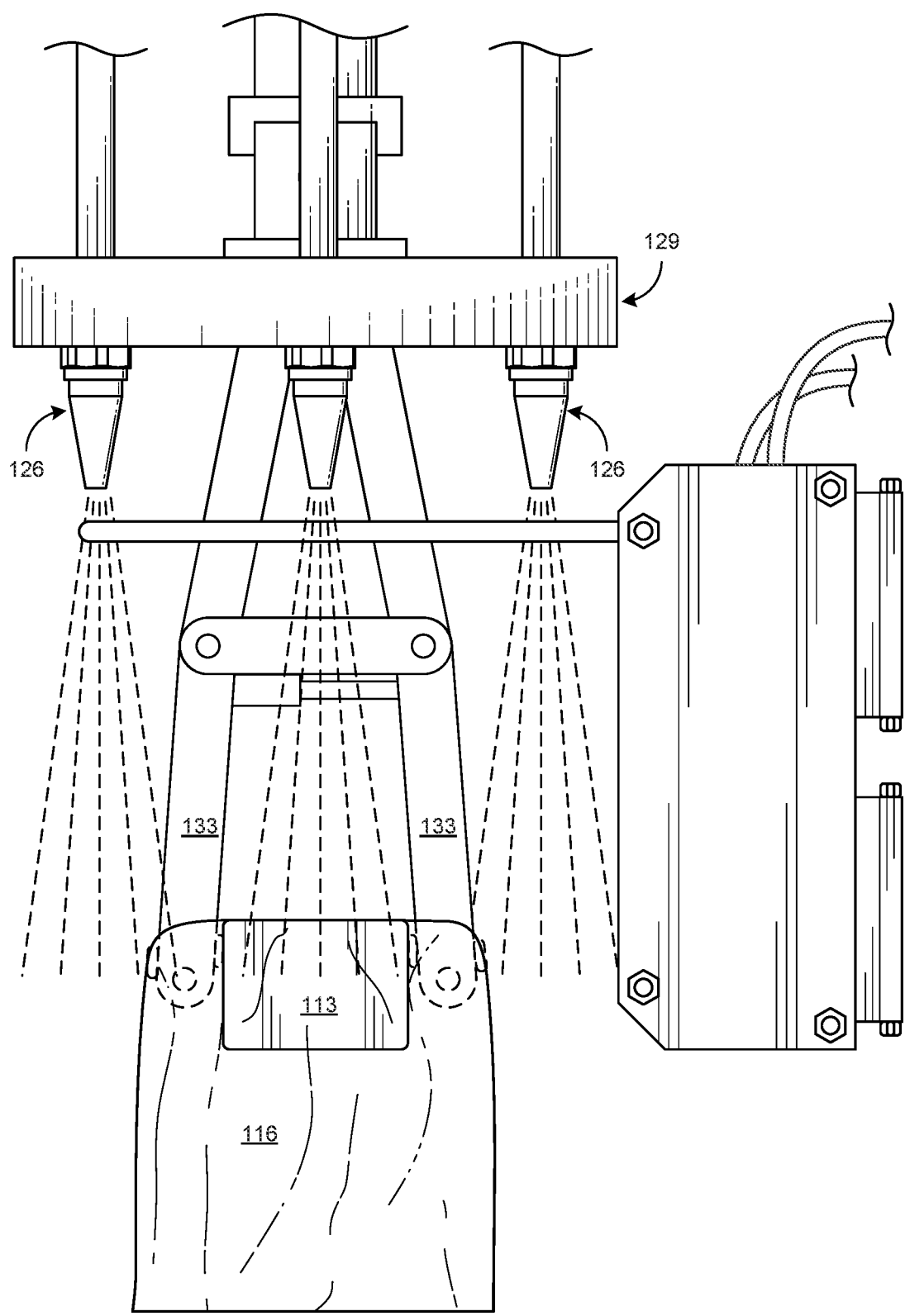
FIG. 6A is a drawing depicting the operation of an example embodiment of the robotic gripper, according to various embodiments of the present disclosure.

FIG. 6A illustrates a fourth step in the operation of an example embodiment of the present disclosure. After gripping the item 113, the air nozzles 126 blow air in the direction of the item 113 and the bag 116 with sufficient pressure to blow the bag 116 off of the fingers 133, thereby inverting the bag 116 and causing the bag 116 to wrap itself around the item 113. The amount of air pressure required can vary based on a number of factors, such as the weight, stiffness, and material of the bag 116; the distance from the egress of an air nozzle 126 to the item 113; the number of air nozzles 126 attached to the mount 129, and potentially other factors.

Figure 6B:
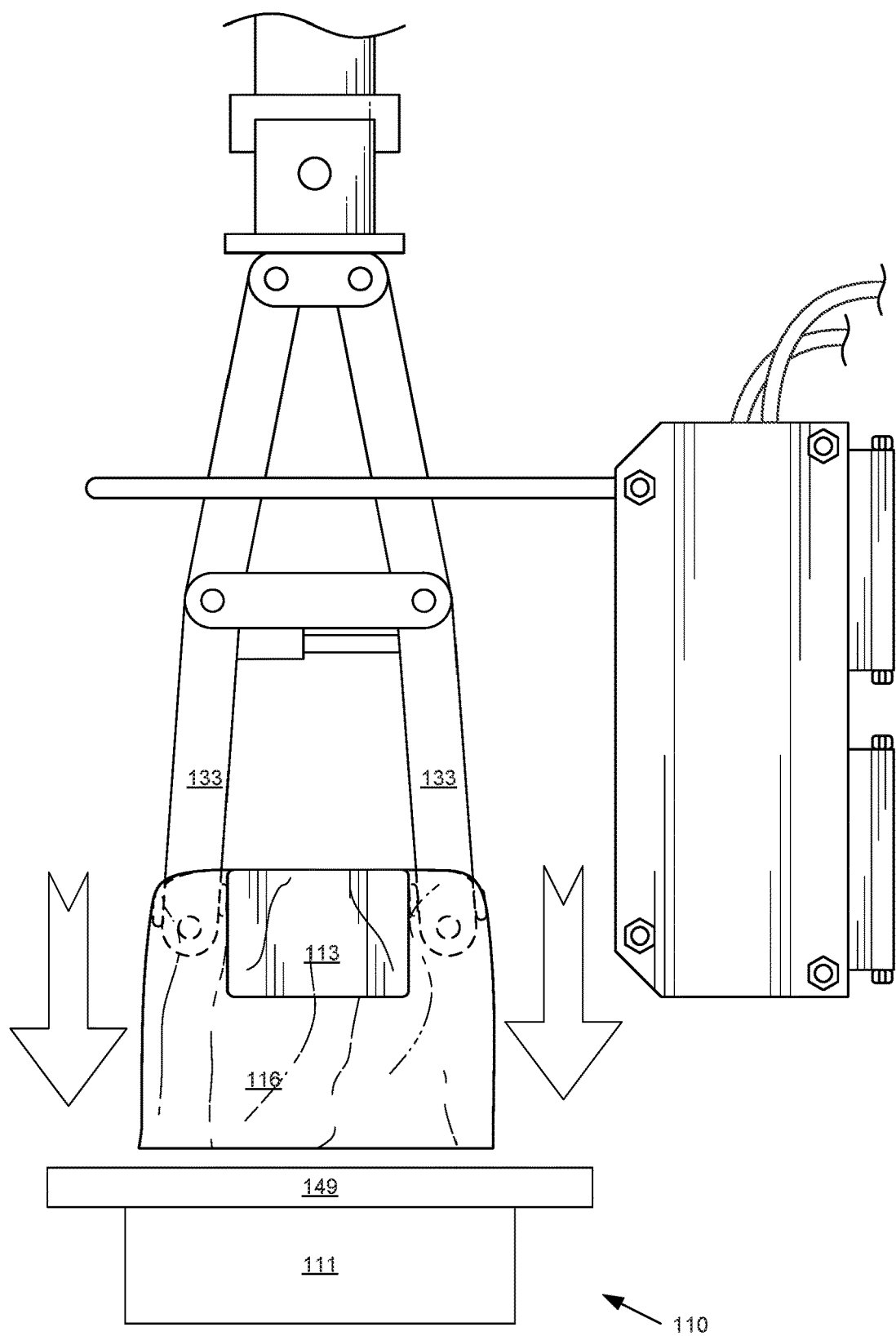
FIG. 6B is a drawing depicting the operation of an example embodiment of the robotic gripper, according to various embodiments of the present disclosure.

FIG. 6B illustrates an alternative implementation of the fourth step in the operation of an example embodiment of the present disclosure. As previously illustrated in FIG. 1B, a conveyor segment 110 transporting an item 113 can include an air displacement device 111. As illustrated in FIG. 6B, the air displacement device 111, when activated, pulls air down through a perforated surface 149 of the conveyor segment 110. This cause the bag 116 to move off of the fingers 133 and down towards the conveyor segment 110, thereby inverting the bag 116 and causing the bag 116 to wrap itself around the item 113. The amount of air pressure required to be generated by the air displacement device 111 can vary based on a number of factors, such as the weight, stiffness, and material of the bag 116; the distance from the egress of an air nozzle 126 to the item 113; the number of air nozzles 126 attached to the mount 129, and potentially other factors. In some embodiments, the use of an air displacement device 111 can be used in place of the air nozzles 126 (FIG. 2) previously described. However, in other embodiments, the air displacement device 111 can be used in addition to the air nozzles 126. For example, the air displacement device 111 may be used in conjunction with one or more air nozzles 126 to generate a larger amount of air pressure on the bag 116. This may be useful, for example, to invert bags 116 made of stiffer materials or to fix a bag 116 that has gotten stuck on a finger 133 or the item 113.

Figure 7:
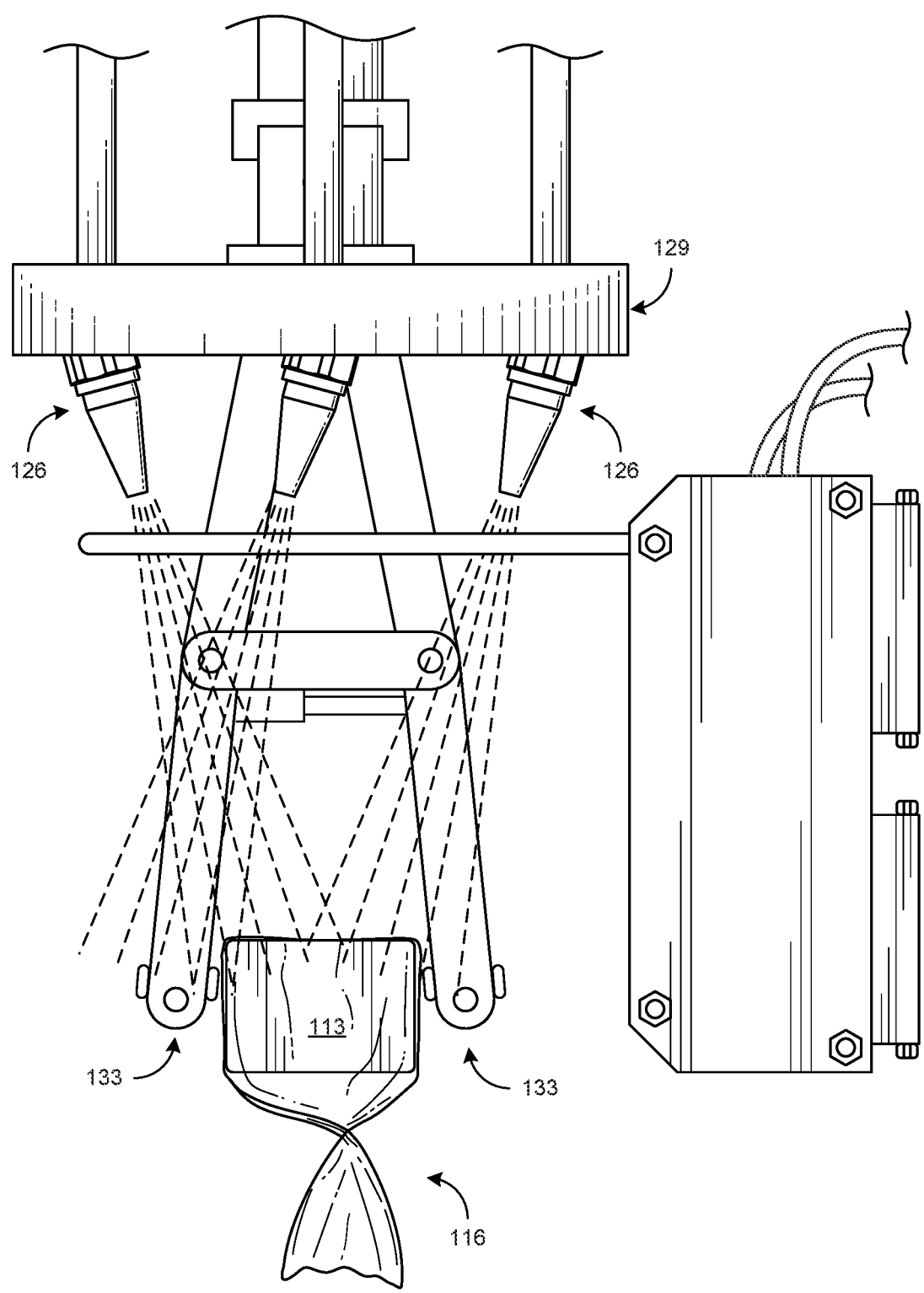
FIG. 7 is a drawing depicting the operation of an example embodiment of the robotic gripper, according to various embodiments of the present disclosure.

FIG. 7 illustrates an alternative implementation of the fourth step in the operation of an example embodiment of the present disclosure. In contrast to other figures, the air nozzles 126 in FIG. 7 are attached to the mount 129 at an angle. This results in the egress of the air nozzles 126 being directed at an angle relative to the item 113 or the end of the fingers 133. As illustrated, one or more of the air nozzles 126 blow air at an angle, causing the bag 116 to rotate around the item 113 as the bag is inverted and blown over the item 113.

As an alternative implementation using similar principals to those illustrated in FIG. 7, one or more air nozzles 126 could be affixed to the robotic arm 103 (FIG. 2). Instead of a mount 129, a sheet with slats or slots could be placed at the end of the robotic arm 103 between the egress of the air nozzles 126 and the robotic gripper 119. This slats or slots would allow for air blown from the air nozzles 126 towards the sheet to pass through the sheet at various angles, in a manner similar to that depicted in FIG. 7.

Subsequent to wrapping the item 113 with the bag 116, as depicted in FIG. 6A, FIG. 6B, or FIG. 7, the item 113 can be manipulated in a number of manners. For example, the item 113 could be placed back on the conveyor belt 109 (FIG. 1) to be ferried to another location. As another example, the item 113 could then be placed in a box or other container. Other actions may also be taken after the item 113 has been wrapped in the bag 116, as would be appropriate for the particular implementation of the present disclosure.

Figure 8:
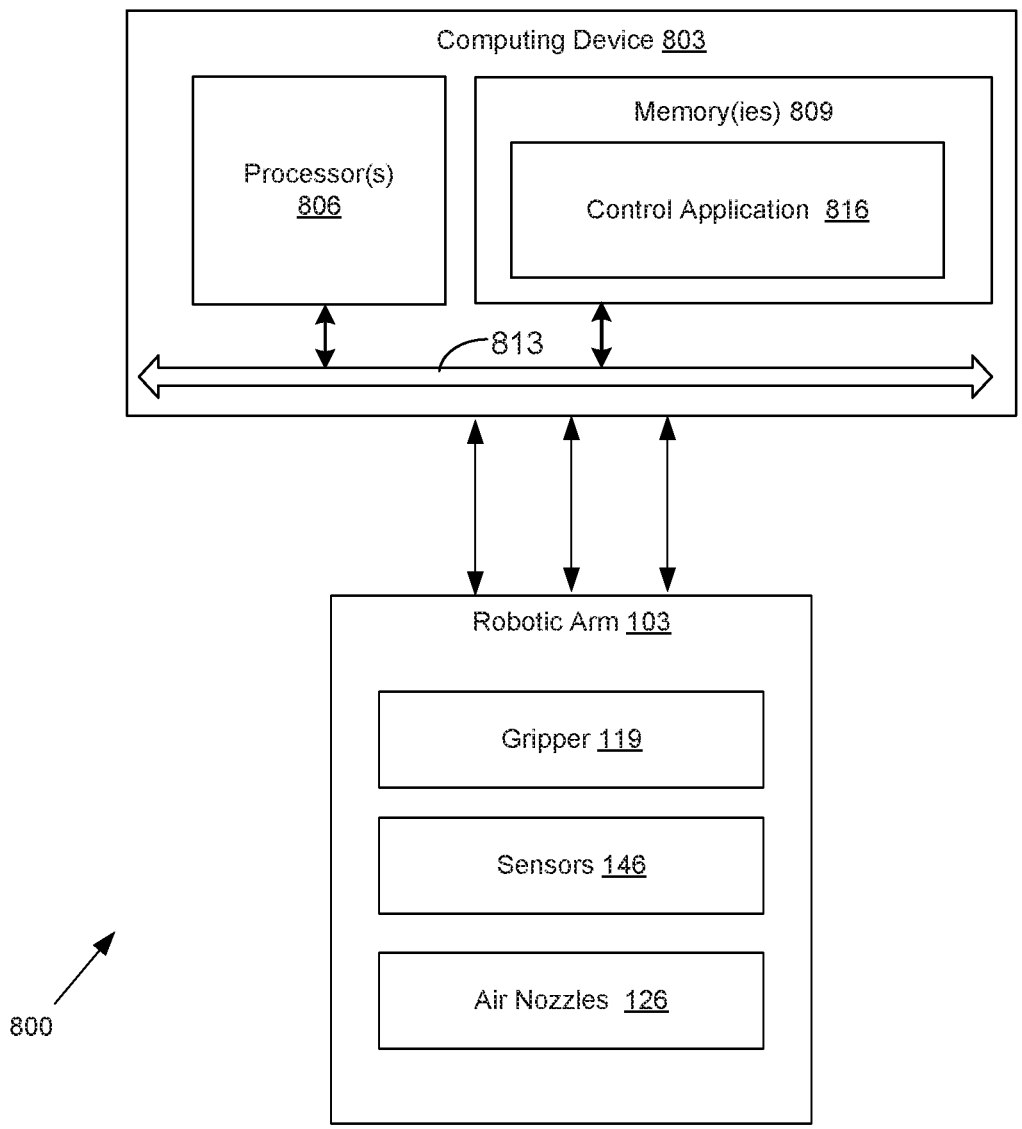
FIG. 8 is a schematic block diagram of an autonomous robotic assembly according to various embodiments of the present disclosure.

With reference to FIG. 8, shown is a schematic block diagram of autonomous robotic assembly 800. The autonomous robotic assembly 800 includes a computing devices 803 and a robotic arm 103 in data communication with each other. In some instances, the computing device 803 may be an integrated component of the robotic arm 103. In these instances, the computing device 803 may represent a programmable logic controller (PLC), a remote terminal unit (RTU), or similar industrial machine control component. In other instances, the computing device 803 may correspond to a remote computing device 803 (e.g., a server, a remotely located desktop, etc.) that is in data communication with the robotic arm 103 in order to send control signals to the robotic arm and receive sensor data from the robotic arm 103.

Each computing device 803 includes at least one processor circuit. The processor circuit can include a processor 806 and a memory 809, both of which are coupled to a local interface 813. The local interface 813 may include a data bus with an accompanying address/control bus or other bus structure as can be appreciated.

Stored in the memory 809 are both data and several components that are executable by the processor 806. In particular, stored in the memory 809 and executable by the processor 806 is the controller application 816, and potentially other applications. Also stored in the memory 809 may be a data store or other data. In addition, an operating system may be stored in the memory 809 and executable by the processor 806. It is understood that there may be other applications that are stored in the memory 809 and are executable by the processor 806 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 809 and are executable by the processor 806. In this respect, the term "executable" means a program file that is in a form that can ultimately be run by the processor 806. Examples of executable programs may be, for example, a compiled program that can be translated into machine code in a format that can be loaded into a random access portion of the memory 809 and run by the processor 806, source code that may be expressed in proper format such as object code that is capable of being loaded into a random access portion of the memory 809 and executed by the processor 806, or source code that may be interpreted by another executable program to generate instructions in a random access portion of the memory 809 to be executed by the processor 806, etc. An executable program may be stored in any portion or component of the memory 809 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 809 is defined herein as including both volatile and nonvolatile memory and data storage components. Volatile components are those that do not retain data values upon loss of power. Nonvolatile components are those that retain data upon a loss of power. Thus, the memory 809 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 806 may represent multiple processors 806 or multiple processor cores and the memory 809 may represent multiple memories 809 that operate in parallel processing circuits, respectively. In such a case, the local interface 813 may be an appropriate network that facilitates communication between any two of the multiple processors 806, between any processor 806 and any of the memories 809, or between any two of the memories 809, etc. The local interface 813 may comprise additional systems designed to coordinate this communication, including, for example, performing load balancing. The processor 806 may be of electrical or of some other available construction.

Although controller application 816, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The controller application 816 can be executed by the processor 806 to control the motions or actions of the robotic arm 103. Accordingly, the controller application 816 may instruct the robotic arm 103 to move through a series of positions or move the gripper 119 from one location to another. For example, the controller application 816 may cause the processor to send a series of electrical signals across the local interface 813 to the robotic arm 103, where each signal in the series of electrical signals causes the robotic arm 103 to perform a particular action in a sequence of actions or move from one location or position to another location or position in a sequence of movements. The controller application 816 may also be executed to interpret data received from one or more sensors 146 affixed to the robotic arm 103 and cause the processor 806 to send an instruction to the robotic arm 103 to perform a particular action or movement in response.

Figure 9:
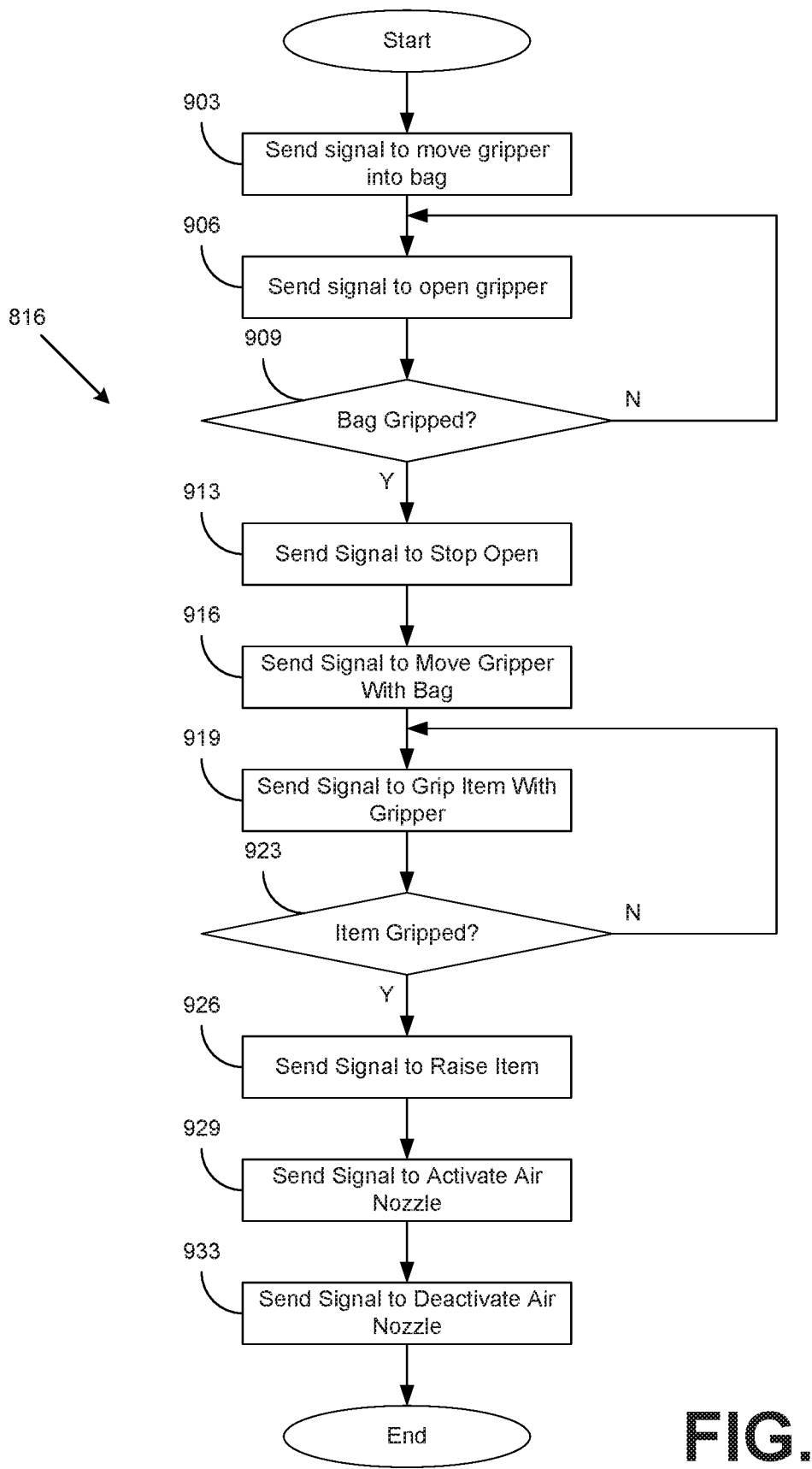
FIG. 9 is a flowchart depicting the functionality of the autonomous robotic assembly of FIG. 8 according to various embodiments of the present disclosure.

Referring next to FIG. 9, shown is a flowchart that provides one example of the operation of a portion of the controller application 816 in the autonomous robotic assembly 800 (FIG. 8) according to various embodiments. It is understood that the flowchart of FIG. 9 provides merely an example of the many different types of functional arrangements that may be employed to implement the operation of the portion of the controller application 816 as described herein. As an alternative, the flowchart of FIG. 9 may be viewed as depicting an example of elements of a method implemented in the autonomous robotic assembly 800 (FIG. 8) according to one or more embodiments.

Beginning with box 903, the controller application 816 causes the processor 806 (FIG. 8) to send a control signal to the robotic arm 103 (FIG. 8) to move the gripper 119 (FIG. 8) into a bag 116 (FIG. 1). The position of the bag 116 may be previously known or configured. For example, the position of the bag 116 along an assembly line may be known because the position of the bag dispenser 106 is also known and rarely, if ever, changes. Therefore, the position of the bag 116 could be easily determined based at least in part on the position of the bag dispenser 106. Accordingly, the controller application 816 could cause the processor 806 to direct the robotic arm 103 to move the gripper 119 into the known position for the bag 116 and, therefore, into the bag 116 itself.

Proceeding to box 906, the controller application 816 causes the processor 806 to send a control signal to the robotic arm 103 to open the gripper 119 inside of the bag 116. For example, the control signal may cause the gripper 119 to open or extend one or more fingers 133 within the bag 116 in order to grasp the edges or walls of the bag 116. In some instances, the control signal may also include instructions for the gripper 119 to rotate, move, or otherwise optimally align itself with the orientation of the bag 116 in order to grip the bag 116.

Moving on to box 909, the controller application 816 determines whether or not the bag 116 has been gripped. For example, one or more sensors 146 (FIG. 8) may send a signal to the processor 806 indicating that the extensor surfaces of the fingers 133 (FIG. 2) of the gripper 119 have come into contact with the walls of the bag 116. The signal received from the sensor 146 may also indicate whether the gripper has securely gripped the bag 116 (e.g., the extensor surfaces of the fingers 133 are securely in contact with the walls of the bag 116 or just barely in contact with the walls of the bag 116). If the signal received from the sensors 146 indicates that the bag 116 has been gripped, the process proceeds to box 913, where the controller application 816 causes the processor 806 to send a control signal to the robotic arm 103 to stop opening the fingers 133. However, if no signal has been received from the sensors 146, or a signal is received that indicates that the fingers 133 have not yet gripped the bag 116, then the process loops back to box 906 so that the controller application 816 can continue to send a signal to the robotic arm 103 to expand the fingers 133 to finish gripping the bag 116.

Referring next to box 916, the controller application 816 causes the processor 806 to send a control signal to the robotic arm 103 to move the gripper 119 with the attached bag 116. The control signal may include an identification of a position or destination for the gripper 119 (e.g., above the item 113 on the conveyor belt 109). In some instances, the control signal may also include a series of motions to be performed by the robotic arm 103 to move the gripper 119 to the specified position. For example, the control signal may specify that the robotic arm 103 is to move the gripper in a circular motion through an arc of 90 degrees. As another example, the control signal may specify that the robotic arm 103 is to move the gripper 119 up six inches, left two feet, and down 18 inches. Other types of motions or instructions may be included in the control signal as appropriate for particular instances of the present disclosure.

Proceeding to box 919, the controller application 816 causes the processor 806 to send a control signal to the robotic arm 103 to grab the item 113 with the gripper 119 while the gripper is holding the bag 116. This action can include one or more substeps, such as causing the robotic arm 113 to move the gripper 119 to the same space that is occupied by the item 113 and then causing the fingers 133 to contract. This will result in the gripper 119 grasping the item 113 with its fingers 133, causing the item 113 to be at least partially encompassed by the bag 116. In some instances, the control signal may also include a series of motions to be performed by the robotic arm 103 to move the gripper 119 in order to grab the item 113. For example, the control signal may specify the distance that the robotic arm 103 is to move the gripper 119 based on the dimensions of the item 113. Shorter or smaller items 113 may require that the robotic arm 103 move further to grab the item 113 than taller or larger items 113 would.

Moving on to box 923, the controller application 816 determines whether the item 113 has been gripped. For example, one or more sensors 146 may send a signal to the processor 806 indicating that the flexor surfaces of the fingers 133 of the gripper 119 have come into contact with the item 113. The signal received from the sensor 146 may also indicate whether the gripper has securely gripped the item 113 (e.g., the flexor surfaces of the fingers 133 are placing a minimum amount of pressure on the item 113). If the signal received from the sensors 146 indicates that the item 113 has been gripped, the process proceeds to box 926. However, if no signal has been received from the sensors 146, or a signal is received that indicates that the fingers 133 have not yet gripped the item 113 or placed a minimum amount of pressure on the item 113, then the process loops back to box 919 so that the controller application 816 can continue to send a signal to the robotic arm 103 to contract the fingers 133 to finish gripping the item 113.

Referring next to box 926, the controller application 816 causes the processor 806 to send a control signal to the robotic arm 103 to stop closing the fingers 133 on the item 113 and raise the item 113 from its current location. Raising the item 113 can create sufficient room for the bag 116 to be blown off of the fingers 133 of the gripper 119 and around the bag 116. Accordingly, the controller application 816 may cause the processor 806 to include in the control signal a height that the robotic arm 103 is to raise the item 113. The height may be based on one or more of a number of factors, such as the size of the bag 116, the size of the item 113, or other considerations.

Proceeding to box 929, the controller application 816 can cause the processor 806 to send a control signal to the robotic arm 103 to activate one or more air nozzles 126. The air nozzles 126 can be activated in order to remove any portion of the bag 116 that may be remaining affixed to the fingers 133. Activating the air nozzles 126 can also cause the bag 116 to more completely encompass the item 116. In some instances, the control signal may specify whether some or all of the air nozzles 126 are to be activated. In some embodiments, the control signal may specify the duration of time for which the air nozzles 126 should blow.

In similar embodiments, the control signal may specify the amount of air pressure the air nozzles 126 should generate. For example, some bags 116 may be made of thin or delicate materials that would rip if the air nozzles 126 were to blow at full pressure. Accordingly, embodiments with adjustable air nozzles 126 may allow for the air pressure to be adjusted by the controller application 816 based at least in part on the type of bag 116 being used.

Proceeding to box 933, the controller application 816 can cause the processor 806 to send a control signal to the robotic arm 103 to deactivate the air nozzles 126 that are blowing. The controller application 816 may cause the processor 806 to send the control signal to the robotic arm 103 after a predetermined or predefined period of time has elapsed, after a predetermined or predefined volume of air is blown from the air nozzles 126, or in response to some other event.

After the process depicted in FIG. 9 is performed, the robotic arm 103 may perform any number of additional actions. For example, the controller application 816 may cause the robotic arm 103 to place the item 113 back in its starting location. As another example, the controller application 816 may move the item 113 to a new location (e.g., another conveyor belt, a table, etc.). Other actions may also be performed as appropriate for particular implementations of the present disclosure.

The flowchart of FIG. 9 shows the functionality and operation of an implementation of portions of the controller application 816. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 806 in a computer system or other system. The machine code may be converted from the source code, etc. If embodied in hardware, each block may represent a circuit or a number of interconnected circuits to implement the specified logical function(s).

Although the flowchart of FIG. 9 shows a specific order of execution, it is understood that the order of execution may differ from that which is depicted. For example, the order of execution of two or more blocks may be scrambled relative to the order shown. Also, two or more blocks shown in succession in FIG. 9 may be executed concurrently or with partial concurrence. Further, in some embodiments, one or more of the blocks shown in FIG. 9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the controller application 816, that comprises software or code can be embodied in any non-transitory computer-readable medium for use by or in connection with an instruction execution system such as, for example, a processor 806 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the controller application 816, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 803, or in multiple computing devices in the same computing environment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
   an articulated robotic arm comprising:
   a mechanical gripper affixed to an end effector of the robotic arm,
   a mount affixed to the end effector of the robotic arm,
   a pressure sensor on an extensor surface of the mechanical gripper, and a plurality of air nozzles affixed to the mount, each of the plurality of air nozzles comprising an egress angularly directed towards the mechanical gripper;

a bag dispenser;

a computing device in data communication with the robotic arm, the computing device comprising a processor and a memory; and an application comprising machine readable instructions stored in the memory that, when executed by the processor, cause the computing device to at least:

direct the robotic arm to position the mechanical gripper into a bag from the bag dispenser;

open the mechanical gripper inside the bag;

stop the mechanical gripper from opening inside the bag in response to the pressure sensor on the extensor surface indicating contact with the bag;

direct the robotic arm to remove the bag from the bag dispenser through movement of the mechanical gripper, with the mechanical gripper inside the bag;

direct the robotic arm and the mechanical gripper to grip an item through the bag with the mechanical gripper;

activate at least one of the plurality of air nozzles to blow the bag at least in part around the item; and deactivate the air nozzle.

2. The system of claim 1, wherein the application further comprises machine readable instructions stored in the memory that, when executed by the processor, further cause the computing device to at least:

direct the robotic arm to raise the item, with the mechanical gripper gripping the item through the bag.

3. The system of claim 1, wherein the articulated robotic arm is articulated to move through six degrees of motion.

4. The system of claim 1, wherein the pressure sensor comprises a piezoelectric sensor.

5. A system, comprising:

a robotic arm comprising a mechanical gripper affixed to an end effector of the robotic arm, a mount affixed to the end effector of the robotic arm, an air nozzle affixed to the mount, and a pressure sensor on an extensor surface of the mechanical gripper;

a bag dispenser;

a computing device in data communication with the robotic arm, the computing device comprising a processor and a memory; and an application comprising machine readable instructions stored in the memory that, when executed by the processor, cause the computing device to at least:

direct the robotic arm to position the mechanical gripper into a bag from the bag dispenser;

open the mechanical gripper inside the bag;

stop the mechanical gripper from opening inside the bag in response to the pressure sensor indicating contact with the bag;

direct the robotic arm to remove the bag from the bag dispenser through movement of the mechanical gripper while inside the bag;

direct the robotic arm and the mechanical gripper to grip an item through the bag with the mechanical gripper; and activate the air nozzle to blow the bag at least in part around the item.

6. The system of claim 5, wherein the pressure sensor comprises a piezoelectric sensor.

7. The system of claim 5, wherein the application further comprises machine readable instructions stored in the memory that, when executed by the processor, further cause the computing device to at least:

deactivate the air nozzle in response to the pressure sensor on the extensor surface indicating no contact with the bag.

8. The system of claim 5, wherein the air nozzle comprises an egress directed towards the mechanical gripper.

9. The system of claim 8, wherein the egress of the air nozzle is angularly directed towards the mechanical gripper.

10. The system of claim 5, wherein the mount is substantially circular in shape and the air nozzle is one of a plurality of air nozzles affixed to the mount.

11. The system of claim 5, wherein the application further comprises machine readable instructions stored in the memory that, when executed by the processor, further cause the computing device to at least:

place the item at a predefined location; and direct the robotic arm and the mechanical gripper to release the item.

12. The system of claim 5, wherein the robotic arm comprises an articulated robotic arm.

\* \* \* \* \*